A. KNAPP.
DRILL CHUCK.
APPLICATION FILED DEC. 6, 1909.

971,901.

Patented Oct. 4, 1910.

WITNESSES

INVENTOR
ARTHUR KNAPP
BY
ATTORNEYS

UNITED STATES PATENT OFFICE.

ARTHUR KNAPP, OF HOUMA, LOUISIANA.

DRILL-CHUCK.

971,901. Specification of Letters Patent. Patented Oct. 4, 1910.

Application filed December 6, 1909. Serial No. 531,554.

*To all whom it may concern:*

Be it known that I, ARTHUR KNAPP, a citizen of the United States, and a resident of Houma, in the parish of Terrebonne and State of Louisiana, have invented certain new and useful Improvements in Drill-Chucks, of which the following is a specification.

My invention is an improvement in drill chucks, and consists in certain novel constructions and combinations of parts, hereinafter described and claimed.

The object of the invention is to provide a chuck of the character specified, which will securely hold a drill point, while at the same time permitting its easy and quick removal and replacement, and which will be simple and inexpensive to construct, and not liable easily to get out of order.

Figure 1:
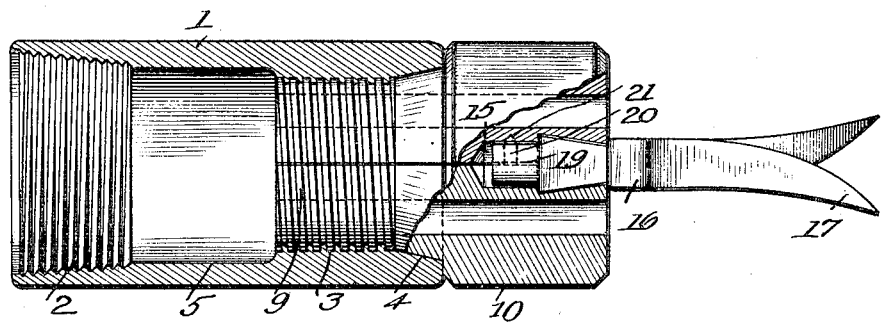
Figure 2:
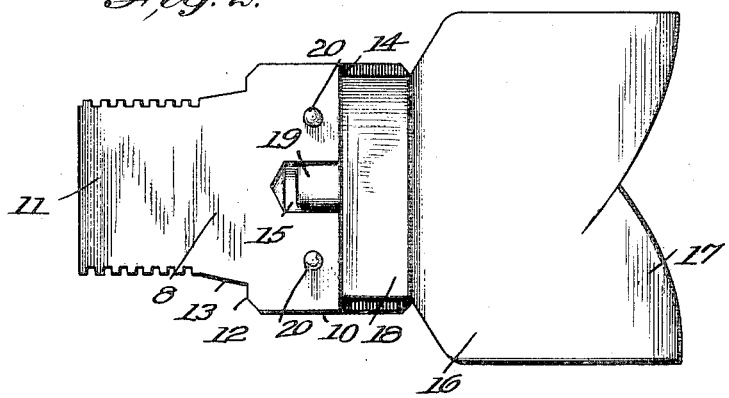
Figure 5:
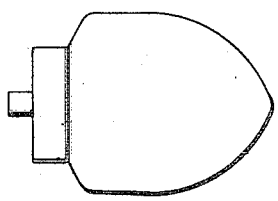
Figure 3:
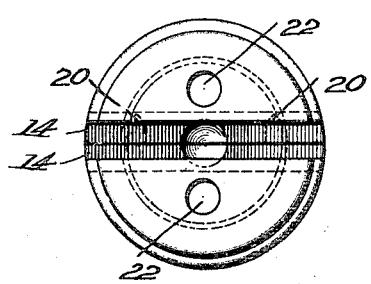
Figure 4:
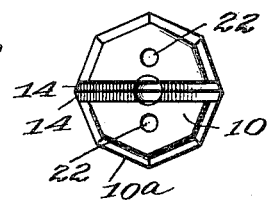

Referring to the drawings forming a part hereof:—Figure 1 is a partial longitudinal section of the improvement. Fig. 2 is a side view of the drill and a section of the split nut. Fig. 3 is an end view of the nut. Fig. 4 is an end view of the nut showing a different external form and Fig. 5 is a detail view showing a different form of bit.

In the embodiment of the invention shown in the drawings, the collar 1 is provided at each end with internally threaded portions 2 and 3, and the inner surface of the end adjacent to the threaded portion 2 is tapering or frusto-conical, the internal diameter of the said end gradually decreasing in cross section from without inwardly. At the end adjacent to the threaded portion 3, the internal diameter is reduced as shown, and the said threaded portion stops short of the end of the collar, the said end being smooth and tapering, as shown at 4, gradually increasing in internal diameter from within outward. Between the threaded portions 2 and 3, the inner surface of the collar is smooth, as at 5, and the end of the collar adjacent to the portion 4 is square to form a shoulder against which a corresponding shoulder on the split nut abuts. The split nut consists of two half sections whose inner faces 8 are flat and the outer faces 9 are rounded, and when the sections are placed with their flat faces abutting, the complete nut is circular in cross section, and consists of a head 10, a reduced portion 11, a shoulder 12 adjacent to the head, and a tapering or beveled portion 13 between the shoulder and the reduced portion. The reduced portion 11 is externally threaded and engages the threaded portion 3 of the collar, and when the nut is screwed home, the shoulder 12 abuts against the flat end of the collar, with the beveled portion 13 fitting the smooth tapered portion 4 of the collar. The flat face of each section is provided with a transverse notch 14 having undercut walls, and at the center of the head with a depression 15, the notches coöperating to form a transverse groove, and the depressions to form a circular recess at the center of the head. The drill point 16 may be of any suitable shape, and comprises a blade 17, a shank 18, and a central pin or lug 19. The shank extends transversely and fits within the groove, the side walls of the shank being shaped to fit the undercut side walls of the groove, and the lug 19 fits the central recess. One of the half sections of the nut is provided with dowel pins 20, and the other with recesses 21 for receiving the dowel pins, and the outer face of the head of the nut is provided with openings 22 on each side of the groove for the passage of water. The point is inserted in place by removing the nut, and separating the sections. The point is inserted between the sections, with the shank in the groove and the pin in the recess, and the sections are then placed together and turned into the collar. There is no probability of the point becoming displaced, until the nut is removed. The undercut side walls of the groove and the corresponding walls of the shank, positively prevent any longitudinal movement of the point, and the pin prevents any lateral movement thereof. By unscrewing the nut, however, the point is easily removed.

It will be evident various means might be provided for permitting the nut to be turned, as, for instance, making the head polygonal in cross section, as shown at 10ª in Fig. 4. The drill point may be various shapes and in Fig. 5 is shown a diamond form.

I claim:—

1. In a device of the character described, a point having a transverse shank with undercut side walls, and a lug at the center of the shank, a split nut comprising a head and a reduced threaded portion and having a shoulder between the head and the reduced portion, the abutting faces of the sections having each a notch with an undercut side wall, the notches coöperating to form a transverse groove for receiving the shank, said faces having each a recess at the center of the notch, the recesses coöperating to form an opening for receiving the lug, and a collar having an internally threaded portion for receiving the reduced portion of the nut, and a square end against which the shoulder abuts, said split nut having longitudinal openings therethrough, for the purpose specified.

2. A device of the character specified, comprising a collar, a split nut having a reduced portion threaded into the collar, a head outside of the collar and a shoulder between the head and the reduced portion and engaging the end of the collar, each section of the said nut having on its inner face a transverse notch with an undercut side wall and a longitudinal groove at the center of the notch, the notches and the grooves registering with each other when the sections are in place, and a drill having a shank with undercut side walls to fit the notches and having a pin for engaging the grooves.

3. A device of the character specified, comprising a clamp composed of sections, each having a flat face abutting the other section, each of the flat faces having a transverse notch at its outer end, the side wall of the notch being undercut, and a recess at the center of the nut, a drill having a shank fitting the notches and a pin engaging the recesses, and means for clamping the sections together.

ARTHUR KNAPP.

Witnesses:
SOLON C. KEMON,
PERRY B. TURPIN.